United States Patent [19]

Foley et al.

[11] 4,052,547

[45] Oct. 4, 1977

[54] PROCESS FOR POLYMERIZING DIOLEFIN COPOLYMERS EMPLOYING A CATALYST MIXTURE OF HYDROPEROXIDES

[75] Inventors: Howard K Foley, Cuyahoga Falls; David A Hutchings, Stow; Terry C Neubert, Ravenna, all of Ohio

[73] Assignee: The Goodyear Tire & Rubber Company, Akron, Ohio

[21] Appl. No.: 691,967

[22] Filed: June 1, 1976

[51] Int. Cl.$^2$ .......................... C08F 4/38; C08F 2/00; C08F 4/42; C08F 236/00

[52] U.S. Cl. .................................. 526/212; 252/426; 526/94; 526/208; 526/228; 526/230; 526/340

[58] Field of Search ................ 526/208, 212, 228, 230

[56] References Cited

U.S. PATENT DOCUMENTS

| | | | |
|---|---|---|---|
| 2,548,435 | 4/1951 | Lorand et al. | 526/230 |
| 2,569,506 | 10/1951 | Vandenberg | 526/230 |
| 2,680,138 | 6/1954 | Wicklatz | 526/230 |
| 2,932,628 | 4/1960 | Uraneck et al. | 526/230 |
| 3,123,590 | 3/1964 | Uraneck et al. | 526/230 |
| 3,489,730 | 1/1970 | Buttar | 526/230 |
| 3,577,376 | 5/1971 | Lanthier et al. | 526/230 |
| 3,607,807 | 9/1971 | Huddleston | 526/230 |

Primary Examiner—Herbert J. Lilling
Attorney, Agent, or Firm—F. W. Brunner; H. C. Young

[57] ABSTRACT

A method of producing a polymeric material comprised of polymerizing at least one unsaturated organic compound in an aqueous emulsion in the presence of a free radical generating redox catalyst comprised of a reducing component and an oxidizing component. Said oxidizing component is a composite prepared by (A) obtaining the oxidation product of reacting p-diisopropylbenzene with oxygen and (B) removing a major portion of resulting p-diisopropylbenzene hydroperoxide and unreacted monomers therefrom to effect a concentration of the remainder of the byproducts therein.

2 Claims, No Drawings

PROCESS FOR POLYMERIZING DIOLEFIN COPOLYMERS EMPLOYING A CATALYST MIXTURE OF HYDROPEROXIDES

This invention relates to a method of free radical polymerizing unsaturated organic compounds in an aqueous emulsion with a redox catalyst utilizing a hydroperoxide composite as the oxidizing component of the redox catalyst. The invention particularly relates to a diisopropylbenzene hydroperoxide composite as an oxidant for interaction with a reducing agent and the product thereof as a redox free radical polymerization initiator.

The polymerization of various monomers in an aqueous emulsion is well known in the art. Indeed synthetic rubber latices are conveniently prepared by the aqueous emulsion free radical polymerization of 1,3-butadiene or its copolymerization with other monomers such as styrene. Such well known emulsion polymerizations are generaly conducted in an aqueous medium in the presence of a surfactant or emulsifier and a free radical initiator or catalyst of the redox type formed through the interaction between an oxidizing and a reducing agent. The reaction is generally shortstopped at a desired point after which the resultant polymer or copolymer is separated and subjected to washing, filtering and drying operations.

Hydroperoxide type oxidizing agents for preparation of redox polymerization initiators have been widely accepted for use in aqueous emulsion free radical polymerizations. Exemplary are liquid mixtures of m- and p-diisopropylbenzene hydroperoxide (U.S. Pat. No. 2,528,435). Such a hydroperoxide type initiator can be prepared by oxidizing diisopropylbenzene with oxygen under relatively mild conditions, including the manipulation of temperatures and/or conversion. The mild preparation conditions are used in order to prevent appreciable formation or accumulation of both the dihydroperoxides and byproducts such as phenols, enols and ketones which inhibit free radical polymerizations. Thus, the free radical polymerization grade hydroperoxide oxidant is typically obtained in a relatively high purity form in a relatively straightforward manner. In the mild preparation method, the remainder of the oxidant material is simply essentially unreacted, or un-oxidized, diisopropylbenzene.

However, it was speculative as to whether an oxidant for the formation of an initiator for free radical aqueous emulsion polymerization could be provided from the composite product produced by more harshly oxidizing p-diisopropylbenzene with oxygen with the attendant formation of not only the desired hydroperoxide but also appreciable amounts of both the dihydroperoxide and inhibiting enols and ketone byproducts, especially if the byproducts were concentrated in the composite.

It would be herein pointed out that, for practical commercial polymerization convenience, it is generally desired that such an oxidant for preparing redox initiators contain about 50 percent equivalent hydroperoxide.

In accordance with this invention, it was discovered that in a method of producing a polymeric material comprised of polymerizing at least one unsaturated organic compound in an aqueous emulsion in the presence of a free radical generating redox catalyst comprised of a reducing component and an oxidizing component, said oxidizing component is a composite prepared by (A) obtaining the oxidation product of reacting p-diisopropylbenzene with oxygen at a temperature in the range of about 100° to about 120° C., preferably about 105° to about 115° C., comprised of a mixture of p-diisopropylbenzene hydroperoxide, p-diisopropylbenzene dihydroperoxide and byproducts comprised primarily of enols and ketones, and unreacted p-diisopropylbenzene and (B) removing by separation a major portion of said p-diisopropylbenzene dihydroperoxide and p-diisopropylbenzene and a minor portion of said p-diisopropylbenzene hydroperoxide to effect a concentration of the remainder having an equivalent monohydroperoxide content by ASTM No. E-298-68 in the range of about 70 percent to about 90 percent comprised, by weight, of about 45 to about 65, preferably about 50 to about 60, percent p-diisopropylbenzene monohydroperoxide, about 5 to about 15, preferably about 5 to about 10, percent p-diisopropylbenzene dihydroperoxide and about 10 to about 30, preferably about 15 to about 25, percent said byproducts containing primarily phenols, enols and ketones.

Optionally and beneficially, the oxidizing component can be enhanced by (C) diluting with at least one alcohol selected from methanol, ethanol and isopropanol, to render the composite a free flowing liquid having hydroperoxide equivalent concentration according to ASTM No. E-298-68 in the range of about 40 to about 60, and preferably about 40 to about 55, percent.

It is important to appreciate in the practice of this invention that the oxidant for the redox catalyst is prepared by first, more harshly oxidizing p-diisopropylbenzene to form generally heretofore, unwanted byproducts therefrom, and further concentrating such byproducts which are generally thought of as being inhibiting with regard to free radical formation for aqueous emulsion polymerization. Indeed, such byproducts contain primarily phenols, enols and ketones. By the term "primarily" it is intended to relate that the byproducts contain at least about 50 weight percent and more generally at least about 90 weight percent of such phenols, enols and ketones. It should be understood that such byproducts can be and more often are components attached to one end of the p-diisopropylbenzene while a monohydroperoxide constituent is attached to the other end. Alternatively, such components can be attached solely to a p-diisopropylbenzene molecule.

In the preparation of the oxidant portion of the redox catalyst the p-diisopropylbenzene is first preferably oxidized with oxygen at a temperature range normally thought of to be excessive for producing good purity p-diisopropylbenzene hydroperoxide with minimal attendant byproduct formation, namely, about 112° to ± 5° C. The product thereof is then treated to remove a major portion of p-diisopropylbenzene dihydroperoxide and p-diisopropylbenzene based upon the original oxidation product as well as a minor portion of the monohydroperoxide. The dihydroperoxide can be substantially removed, for example, by crystallization and/or fractionation techniques. The p-diisopropylbenzene can be removed by fractionation as a distillate, although a portion of its monohydroperoxide will normally be removed also.

As a result in such a fractionation, the normally unwanted byproducts are concentrated in the monohydroperoxide and the composite fraction can be recovered, or obtained, as a distilland.

In the practice of this invention, although a free radical aqueous emulsion copolymerization of 1,3-butadiene and styrene had a slower overall reaction time than such a copolymerization initiated with a commercially obtainable mixture of m- and p-diisopropylbenzene hydroperoxide as the redox catalyst oxidant, nevertheless, the use of the product of the more harshly oxidized p-diisopropylbenzene containing the concentrated byproducts was deemed successful in that it demonstrated that a workable free radical initiator could be achieved, particularly with the optional alcohol addition.

The hydroperoxide equivalent concentration can be conveniently determined (ASTM No. E-298-68) on the hydroperoxide oxidant composite. By this measure the analysis assumes that all of the hydroperoxide is in the monohydroperoxide form although it is acknowledged that a portion thereof is dihydroperoxide.

The emulsion polymerization itself is conducted in conventional manner utilizing conventional emulsifying agents for emulsifying the monomer and product and modifiers such as various mercaptans. The pH of the aqueous phase is conventionally in the range of about 3 to about 12. Conventional reaction times and temperatures are used. The actual redox catalyst itself is prepared by reacting the oxidant with conventional reducing agents such as ferrous pyrophosphate, hydrosulphite of an alkali metal such as sodium or potassium, sodium formaldehyde sulphoxylate, various amines such as tetraethylene pentamine and chelated ferrous iron as well as other reducing agents such as ferrous sulfate and ferrous chloride.

Various monomers can be polymerized and copolymerized according to the free radical aqueous emulsion system of this invention such as those having the structure $CH_2=C<$. Representative of such monomers are conjugated dienes such as 1,3-butadiene, 2,3-dimethyl-1,3-butadiene, isoprene, piperylene and chloroprene, and particularly such conjugated dienes in a copolymerization with allyl olefins such as styrene, alpha-methyl styrene, p-chlorostyrene, and the like; acrylic and substituted acrylic acids and their esters, nitriles and amides, such as acrylic acid, methacrylic acid; methyl acrylate; ethyl acrylate; and methyl hexyl acrylate as well as vinyl acetate, vinyl chloride and vinylidene chloride.

Particularly preferable monomers are 1,3-butadiene, styrene and particularly the combination of butadiene or isoprene with styrene. Usually, in these cases, it is preferred to use relative ratios of butadiene to styrene in the range of about 65/35 to about 90/10 by weight.

The practice of this invention is further illustrated by reference to the following examples which are intended to be representative rather than restrictive of the scope of the invention. Unless otherwise indicated, all parts and percentages are by weight.

EXAMPLE I

A butadiene/styrene rubbery copolymer was prepared by aqueous emulsion free radial polymerization according to the following recipe:

Table 1

| Compound | Parts |
| --- | --- |
| Water | 195.0 |
| Sodium salt of disproportionated rosin acids | 2.8 |
| Tallow fatty acids | 2.0 |
| Potassium hydroxide | 0.4 |
| Sodium salt of condensed naphthalene sulfonate | 0.1 |
| Tri Potassium phosphate | 0.2 |
| Disodium phosphate heptahydrate | 0.2 |
| Styrene | 18.0 |
| 1,3-Butadiene | 82.0 |

Table 1-continued

| Compound | Parts |
| --- | --- |
| Tertiary $C_{12}$ mercaptan | 0.2 |
| Oxidant for Redox catalyst[1] | 0.1 |

[1]Oxidant for preparation of redox free radical generating catalyst was the fraction derived from the reaction of oxygen with p-diisopropylbenzene and concentrated with regard to byproducts. It had a monohydroperoxide equivalent of 49.8 weight percent based on ASTM No. E-298-68. It was a mixture of 20 weight percent of such fraction and 15 weight methanol.

Table 2

| Compound | Parts |
| --- | --- |
| Water | 5.00 |
| Sulfuric acid | trace |
| Tetrasodium salt of ethylene diamine tetra acetic acid | 0.06 |
| Ferrous sulfate heptahydrate | 0.018 |
| Potassium pyrophosphate | 0.029 |
| Sodium formaldehyde sulfoxylate | 0.065 |

The emulsion copolymerization proceeded satisfactorily after an induction period. A satisfactory copolymer was produced.

While certain representative embodiments and details have been shown for the purpose of illustrating the invention, it will be apparent to those skilled in this art that various changes and modifications may be made therein without departing from the spirit or scope of the invention.

What is claimed is:

1. In a method of producing a polymeric material comprised of polymerizing at least one unsaturated organic compound, selected from a mixture of 1,3-butadiene and styrene or a mixture of isoprene and styrene, in an aqueous emulsion in the presence of a free radical generating redox catalyst comprised of a reducing component and an oxidizing component, said oxidizing component is a composite prepared by (A) obtaining the oxidation product of reacting p-diisopropylbenzene with oxygen under relatively harsh temperature conditions at a temperature in the range of about 100° to about 120° C. comprised of a mixture of p-diisopropylbenzene hydroperoxide and byproducts comprised at least about 90 weight percent of phenols, enols and ketones, and unreacted p-diisopropylbenzene and (B) removing by separation a major portion of said p-diisopropylbenzene dihydroperoxide and unreacted p-diisopropylbenzene and a minor portion of said p-diisopropylbenzene hydroperoxide to effect a concentration of the remainder of the mixture as a distilland having an equivalent monohydroperoxide content by ASTM No. E-298-68 in the range of about 70 to about 90 percent comprised, by weight of about 45 to about 65 percent p-diisopropylbenzene monohydroperoxide about 5 to about 15 percent p-diisopropylbenzene dihydroperoxide and about 10 to about 30 percent said byproducts containing primarily phenols, enols and ketones, where said remainder distilland mixture is enhanced by (C) diluting with at least one alcohol selected from methanol, ethanol and isopropanol, to render the composite a free flowing liquid having hydroperoxide equivalent concentration according to ASTM No. E-298-68 in the range of about 40 to about 60 percent.

2. The method of claim 1 where said p-diisopropylbenzene oxidation product is prepared by initially oxidizing p-diisopropylbenzene with oxygen at a temperature of about 112° ± 5° C., removing a major portion of said p-diisopropylbenzene diihydroperoxide by crystallization, removing a major portion of unreacted p-diisopropylbenzene and minor portion of said p-diisopropylbenzene monohydroxide by fractionation as a distillate and recovering said oxidizing component as a distilland.

* * * * *